Patented Feb. 14, 1950

2,497,323

UNITED STATES PATENT OFFICE 2,497,323

POLYMERIZATION OF ETHYLENE

Milton J. Roedel, Wilmington, Del., assignor to E. I. du Pont de Nemours and Company, Wilmington, Del., a corporation of Delaware No Drawing. Application June 15, 1949, Serial No. 99,345

6 Claims. (Cl. 260—94.9)

This invention relates to improvements in the catalytic polymerization of ethylene, and to products thus obtained.

It is known that ethylene can be polymerized with the aid of catalysts such as dialkyl dioxides, alkyl hydroperoxides, acyl peroxides, chloramine T, manganese dioxide, amine oxides, tetraphenyltin, tetraethyllead, butyl lithium, hexachloroethane, sodium perborate, sodium persulfate, and hydrazine salts and substituted hydrazines. However, these catalysts have many shortcomings. For instance, some may contaminate the ethylene polymer with an inorganic residue which impairs its excellent electrical properties and heat stability, or they may promote cross-linking to give a polymer of limited solubility and melt extrudability, or they may give ethylene polymers possessing a relatively low tensile strength.

It is the object of this invention to provide a new and improved method for polymerizing ethylene alone and in admixture with other polymerizable compounds containing a polymer-producing linkage.

Another object is to provide a new class of catalysts for the polymerization of ethylene alone and in admixture with other polymerizable organic compounds containing a polymer-producing linkage to obtain polymers having exceptionally high tensile strength and stiffness values. Other objects will appear as the description proceeds.

These and other objects are accomplished in accordance with the invention by polymerizing ethylene in the presence of a tertiary alkyl percarboxylate catalyst. In general alkyl percarboxylates of the formula

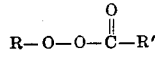

where R is a tertiary butyl group and R' is a hydrocarbon group in which the carbon atom alpha to the

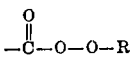

group has all its valencies saturated by carbon atoms, are the preferred members of this class of ethylene polymerization catalysts since these compounds are resistant to ready hydrolysis to the free acid and the alkyl hydroperoxide. In particular embodiments it is desirable that R' be an aromatic or saturated aliphatic tertiary hydrocarbon group containing from four to twenty carbon atoms. As an example may be mentioned tertiary butyl perbenzoate which is readily prepared from the sodium salt of tertiary butyl hydroperoxide and benzoyl chloride. This catalyst is generally stable to shock at ordinary temperatures, and may be weighed or measured by volume and charged without trouble or hazard. Tertiary butyl petrimethylacetate is also a catalyst of this preferred group. Other such catalysts are tertiary butyl esters of pertoluic, perphthalic, and per-alpha, alpha-dimethylalkanoic acids containing up to twenty carbon atoms.

Tough orientable polymers of ethylene possessing very high tensile strength are prepared by the polymerization of ethylene in anhydrous benzene using tertiary butyl perbenzoate as the catalyst at temperatures of 70° C. to 250° C. and ethylene pressures of 400 to 1000 atmospheres or above.

As a rule the amount of tertiary butyl perbenzoate, or its equivalent, will vary from about 0.0005% to about 2% on the total weight of materials charged into the reaction vessel.

The polymerization of ethylene employing tertiary butyl perbenzoate as catalyst can be carried out either as a batch, semi-continuous, or continuous operation in vessels which are constructed of or lined with stainless steel, silver, aluminum, mild steel, etc.

In operating the process batchwise, a suitable reactor is charged with a non-polymerizable liquid medium and catalyst. The vessel is closed, placed on a heated shaker machine, and connected to a source of ethylene. Controlling and recording thermocouples are inserted into the reactor. The reactor is charged with ethylene to the desired pressure and heating and agitation are started. Upon reaching reaction temperature, the reaction starts and is normally followed by a pressure drop due to utilization of the ethylene. The pressure within the system is maintained throughout the reaction period by repressuring with ethylene. After reaction is complete, the reactor is cooled, opened, and the contents discharged. The reaction product is recovered by conventional means, e. g., filtration, etc.

The examples which follow are intended to illustrate and not to limit this invention. Unless otherwise stated, the parts are by weight.

*Example 1.*—A stainless steel pressure reactor is flushed out with dry, oxygen-free nitrogen and is charged with 88 parts of anhydrous, thiophene-free benzene and 0.3 part of tertiary butyl perbenzoate. This charge occupies about 25% of the volume of the reactor. After removal of the nitrogen by evacuation, the reactor is charged with anhydrous ethylene to a pressure of 285 atmospheres, and heated to 125° C. Upon reaching this temperature, the ethylene pressure is raised to 950 atmospheres and the polymerization is allowed to proceed with agitation of the vessel for an 18-hour period. As the ethylene polymerizes, the system is kept between 850 to 950 atmospheres pressure by the addition of more ethylene. The total pressure drop is about 250 atmospheres. The reactor is cooled and the excess ethylene bled off. There is obtained 24 parts of a solid, orientable ethylene polymer possessing an intrinsic viscosity of 1.55 (measured as a 0.125% solution in xylene at 85° C.). This ethylene polymer possesses a tensile strength in excess of 4000 lbs./sq. in. (4,420 lbs./sq. in. at 590% elongation), a bending modulus of $0.030 \times 10^6$ lb./sq. in., a tear resistance of 119 cellophane units (cellophane=9), and is soluble to the extent of at least 20% in xylene at 100° C. Fibers prepared by dry spinning this polyethylene gave tenacities of 6.4 grams per denier. In view of these oustanding properties, this polymer is especially well suited for use in monofils, fibers, unsupported wrapping films, and coated fabrics where high polymer toughness is a prime requisite.

*Example 2.*—A stainless steel pressure reactor is flushed with oxygen-free nitrogen and charged with 100 parts of deoxygenated water (i. e. water from which dissolved oxygen has been removed) and 0.3 part of tertiary butyl perbenzoate. This charge occupies about 25% of the volume of the reactor. After removal of the nitrogen by evacuation, the reactor is charged with ethylene to a pressure of 590 atmospheres and heated to 75° C. Upon reaching this temperature, the ethylene pressure is raised to 950 atmospheres and the polymerization is allowed to proceed with agitation of the vessel. As the ethylene polymerizes, the system is kept between 850 and 950 atmospheres pressure by the addition of more ethylene. After an 18-hour period, the reactor is cooled and the excess ethylene is bled off. There is obtained 12 parts of solid, crystalline ethylene polymer having an intrinsic viscosity of 2.17 (measured as a 0.125% solution in xylene at 85° C.). This polymer has a bending modulus of $0.038 \times 10^6$ lb./sq. in.

*Example 3.*—A stainless steel pressure reactor is flushed with oxygen-free nitrogen and is charged with 100 parts of deoxygenated water as the polymerization medium, 5.4 parts of 1,3-dioxolane as a molecular weight control agent and 0.3 part of tertiary butyl perbenzoate as the catalyst. This charge occupies about 25% of the volume of the reactor. After removal of the nitrogen by evacuation, the reactor is charged with ethylene to a pressure of 395 atmospheres and heated to 100° C. Upon reaching this temperature, the ethylene pressure is raised to 950 atmospheres and polymerization is allowed to proceed with agitation of the vessel. As the ethylene polymerizes, the system is kept between 860 and 950 atmospheres by the addition of more ethylene. After a 16.5 hour period the reactor is cooled and the excess ethylene is bled off. There is obtained 39 parts of solid, crystalline ethylene polymer possessing an intrinsic viscosity of 1.18 (measured as a 0.125% solution in xylene at 85° C.). This polymer has a bending modulus of $0.068 \times 10^6$ lbs./sq. in. which is about a four-fold increase in stiffness over commercially available polyethylene (moduli of about 0.013 to 0.017). This marked improvement in stiffness is very desirable for such outlets as wrapping films where high stiffness is required for satisfactory handling in automatic wrapping machines.

Polymerization media which are operable in this invention include water, a mixture of water and an inert organic solvent for ethylene, such as the azeotrope of tertiary butyl alcohol/water or water/benzene mixture, or an inert organic solvent for ethylene such as benzene, cyclohexane, isooctane, tertiary butyl alcohol, etc., in the absence of water.

Bulk polymerization in the absence of an inert medium may also be employed.

It is preferable to use reagents as pure as is commercially feasible. In general the process is operated under conditions such that the molecular oxygen content of the system is less than 1000 parts per million (by weight), under 200 parts per million being preferred, and under 10 parts per million giving the most outstanding products.

The catalysts used in the present process are operable at temperatures which may be as low as 40° C. and as high as 400° C. It is generally preferred to operate at temperatures in the range of 70° to 250° C. and at pressures in excess of atmospheric. In general, pressures in excess of 4 atmospheres can be used and more usually pressures in the range of 25 to 1000 atmospheres, preferably 400 to 1000 atmospheres are employed. As a rule, the use of higher pressures permits the use of lower temperatures. The maximum pressures employed are limited only by the strength of available materials and may be as high as 3000 atmospheres or even higher. The particular conditions of temperature and pressure in any one case are determined not only by the particular catalyst used, but also by the material being polymerized. Temperatures and pressures are interdependent variables and the conditions for optimum results in any one instance have to be determined experimentally. These catalysts are rapid and enduring in their activity and it is advantageous to employ them in a continuous polymerization system from which the products are removed continuously. Such a continuous process may be exemplified by the passage of the whole polymerization mixture through a reaction zone maintained at appropriate polymerization conditions or by passing the reactants separately through a mixing chamber, then through a reaction zone or by pumping the reactants separately through a reaction zone and introducing the catalyst in solution immediately prior to entering the reaction zone. In a continuous process, the catalyst solution or suspension can be introduced at intermediate stages throughout the reaction zone, since by this means the heat developed in any one portion of the apparatus is relatively small and consequently the polymerization can be carried through to a desired high molecular weight product. The present process is exothermic in character and, as in any process where the amount of heat to be removed is large, a continuous process permits greater precision in control and consequently more uniformly excellent results.

The catalysts of this invention are operable in the absence of agitation but in many instances good agitation is conducive to good yields of polymer.

Ethylene copolymers can likewise be obtained using tertiary butyl perbenzoate as catalyst by introducing one or more monomers such as vinyl fluoride, tetrafluoroethylene, vinyl chloride, methyl methacrylate, vinyl acetate, vinylidene chloride, styrene, vinylphthalimide, vinylsuccinimide, dimethyl fumarate or maleate, carbon monoxide, etc. into the reactor before or during the polymerization process.

The products produced in accordance with this invention are especially useful for monfils or fibers because of the extremely high tenacities obtained therefrom and for wrapping films because of the high stiffness exhibited. They also are useful for hot-dip and melt-spray applications, for conversion to electrical and thermal insulating materials, for use as protective coatings and for many other purposes well known to the art. Pigments, fillers, dyes, antioxidants, plasticizers and like materials can also be added to the products of this invention when desirable.

The term "polymer" is used herein in a generic sense to refer to the polymers of ethylene alone and to polymers of ethylene with at least one other polymerizable organic compound.

The present application is a continuation-in-part of my copending application S. N. 595,249, filed May 22, 1945, now abandoned, wherein I have disclosed that tertiary alkyl percarboxylates may be employed as catalysts in the process of this invention. Specific details as to methods for preparing tertiary alkyl percarboxylate catalysts also have been disclosed more recently in certain publications of Milas and coworkers, J. A. C. S. 68, 642 (1946); for example, tertiary butyl perbenzoate is obtainable by reacting tertiary butyl hydroperoxide at 10° to 20° C. with benzoyl chloride and simultaneously reacting the mixture with aqueous potassium hydroxide for one hour with stirring, allowing the resulting product to stand overnight, separating the organic layer, washing it with 5% solution of Na₂CO₃ in water, washing the resulting organic layer with water, and distilling tertiary butyl perbenzoate from the mixture at a pressure of 2 mm.

I claim:

1. The process for polymerizing ethylene which comprises heating ethylene at a temperature of 70° to 250° C. in the presence of 0.005% to 2.0%, based on the total weight of the reaction mixture, of a tertiary alkyl percarboxylate of the formula

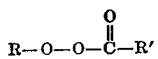

wherein R is a tertiary alkyl group and R' is a member of the class consisting of aryl hydrocarbon radicals, the number of carbon atoms in R' being not greater than 20, under a pressure above 25 atmospheres.

2. The process for polymerizing ethylene which comprises heating ethylene at a temperature of 70° to 250° C. in an inert organic solvent for ethylene in the presence of 0.005% to 2.0%, based on the total weight of the reaction mixture, of a tertiary alkyl percarboxylate of the formula

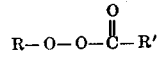

wherein R is a tertiary alkyl group and R' is a member of the class consisting of aryl hydrocarbon radicals, the number of carbon atoms in R' being not greater than 20, under a pressure of from 400 to 3000 atmospheres.

3. The process for polymerizing ethylene which comprises heating ethylene at a temperature of 70° to 250° C. in an inert reaction medium in the presence of 0.005% to 2.0%, based on the total weight of the reaction mixture, of a tertiary alkyl percarboxylate of the formula

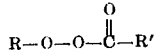

wherein R is a tertiary alkyl group and R' is a member of the class consisting of aryl hydrocarbon radicals, the number of carbon atoms in R' being not greater than 20, under a pressure of from 400 to 3000 atmospheres.

4. The process of claim 3 wherein the said inert medium is water.

5. The process of claim 3 wherein the said inert medium is benzene.

6. The process for polymerizing ethylene which consists essentially in heating ethylene in a reaction vessel which is substantially free of gaseous oxygen, in the presence of benzene and 0.005% to 2.0%, based on the total weight of the reaction mixture, of tertiary butyl perbenzoate catalyst at a temperature of 125° C. under a pressure of about 850 to 950 atmospheres, whereby a tough orientable ethylene polymer having a tensile strength in excess of 4000 lbs. per sq. in. is obtained.

MILTON J. ROEDEL.

REFERENCES CITED

The following references are of record in the file of this patent:

UNITED STATES PATENTS

| Number | Name | Date |
|---|---|---|
| 2,153,553 | Fawcett | Apr. 11, 1939 |
| 2,403,709 | Dickey | July 9, 1946 |
| 2,450,451 | Schmerling | Oct. 5, 1948 |

OTHER REFERENCES

Milas et al., J. Am. Chem. Soc. 68 642-3 (April 1946).